US009380428B1

(12) United States Patent
Dame et al.

(10) Patent No.: US 9,380,428 B1
(45) Date of Patent: Jun. 28, 2016

(54) LOCATION-BASED SERVICES ONBOARD AIRCRAFT

(71) Applicant: The Boeing Company, Chicago, IL (US)

(72) Inventors: Stephen Gregory Dame, Everett, WA (US); Yakentim M. Ibrahim, Brier, WA (US); Joseph M. Keegan, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/790,559

(22) Filed: Jul. 2, 2015

(51) Int. Cl.
*H04W 4/02* (2009.01)
*H04W 4/04* (2009.01)
*H04W 64/00* (2009.01)

(52) U.S. Cl.
CPC .............. *H04W 4/023* (2013.01); *H04W 4/043* (2013.01); *H04W 64/00* (2013.01)

(58) Field of Classification Search
CPC ...... H04W 4/023; H04W 4/043; H04W 64/00
See application file for complete search history.

(56) References Cited

U.S. PATENT DOCUMENTS

| 7,319,854 | B2 * | 1/2008 | vonDoenhoff et al. ........ 455/345 |
| 8,718,620 | B2 | 5/2014 | Rosenblatt |
| 8,847,754 | B2 * | 9/2014 | Buchheim et al. ........ 340/539.13 |
| 2011/0133891 | A1 * | 6/2011 | Krug et al. .................... 340/10.1 |
| 2014/0309924 | A1 | 10/2014 | Varoglu et al. |
| 2015/0038171 | A1 | 2/2015 | Uilecan et al. |
| 2015/0242888 | A1 * | 8/2015 | Zises ............................ 705/14.5 |

\* cited by examiner

*Primary Examiner* — Leon Flores
(74) *Attorney, Agent, or Firm* — Duft Bornsen & Fettig LLP

(57) ABSTRACT

Embodiments described herein provide location-based services onboard an aircraft for users having mobile devices utilizing wireless beacons dispersed at fixed locations within a passenger cabin of the aircraft. One embodiment comprises a system that includes a plurality of wireless beacons and a location server. Each of the wireless beacons broadcast a unique ID in a broadcast area for receipt by the mobile devices. The location server receives a message from a mobile device that indicates at least one of the IDs received by the mobile device, and identifies location information for the mobile device within the passenger cabin based on the at least one ID. The location server provides the location information to the mobile device for display to a user.

16 Claims, 11 Drawing Sheets

LOCATION-BASED SERVICES ONBOARD AIRCRAFT

FIELD

This disclosure relates to the field of location-based services, and in particular, to providing location-based services onboard aircraft.

BACKGROUND

Location-based services utilize location data to control features and options presented to users of mobile devices. For instance, a location-aware application for a mobile device can direct a user to a nearby bank or a particular type of restaurant. When traveling, location-based services can be helpful to inform the user about nearby features and options that would not necessarily be evident to a user. For instance, location-based services may allow a traveler to locate a particular type of restaurant in an unfamiliar airport. However, passengers traveling by aircraft may have a desire that their location-based services do not simply end at the airport, but continue on through other portions of their air travel process.

SUMMARY

Embodiments described herein provide location-based services onboard an aircraft utilizing wireless beacons dispersed at fixed locations within a passenger cabin of the aircraft. A location server onboard the aircraft is capable of determining location information for a user's mobile device within the passenger cabin based on IDs from the wireless beacons that are forwarded to the location server from the mobile device. Utilizing the location information for the user's mobile device, the location server is able to provide various location-based services to the user.

One embodiment comprises a system for providing location-based services onboard an aircraft for users having mobile devices. The system includes a plurality of wireless beacons and a location server. The wireless beacons are dispersed at fixed locations within a passenger cabin of the aircraft, and each wireless beacon broadcasts a unique ID in a broadcast area for receipt by the mobile devices. The location server receives at least one ID from a mobile device, and identifies location information for the mobile device within the passenger cabin based on the at least one ID. The location server provides the location information to the mobile device for display to a user.

Another embodiment comprises a method for providing location-based services onboard an aircraft for users having mobile devices. The method comprises broadcasting, by each of a plurality of wireless beacons that are dispersed at fixed locations within a passenger cabin of the aircraft, a unique ID in a broadcast area for receipt by the mobile devices. The method further comprises receiving, by a location server, a message from a mobile device that indicates at least one ID received by the mobile device. The method further comprises identifying, by the location server, location information for the mobile device within the passenger cabin based on the at least one ID, and providing, by the location server, the location information to the mobile device for display to a user.

Another embodiment comprises a system that includes a Power over Ethernet (PoE) network onboard an aircraft, a plurality of wireless beacons that are electrically coupled to the PoE network, and a location server electrically coupled to the PoE network. The wireless beacons are dispersed at fixed locations within a passenger cabin of the aircraft, and broadcast unique identifiers (IDs) proximate to the locations. The location server receives at least one of the IDs from a Personal Electronic Device (PED) of a passenger, and identifies a location of the PED within the passenger cabin based on the at least one of the IDs. The location server identifies a map of a Layout Of Passenger Accommodations (LOPA) for the aircraft, and modifies the map to indicate the location of the PED within the passenger cabin. The location server transmits the modified map to the PED.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
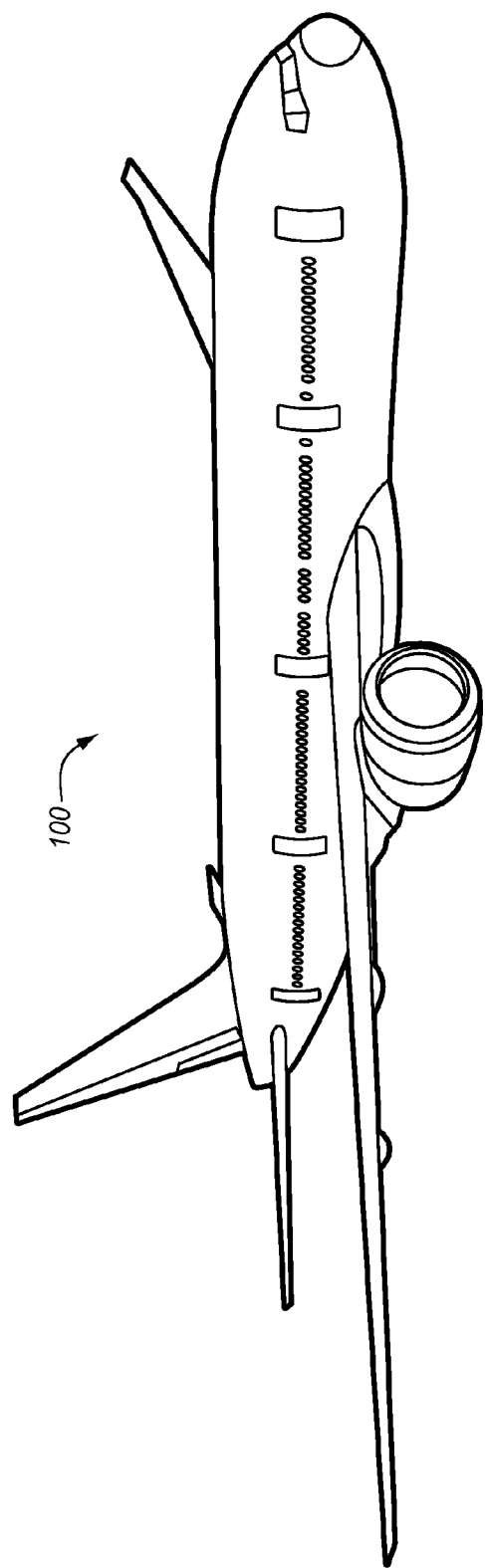
FIG. 1 illustrates an aircraft implementing location-based services in an exemplary embodiment.

FIG. 1 illustrates an aircraft 100 implementing location-based services in an exemplary embodiment. In this embodiment, aircraft 100 includes a plurality of wireless beacons (not shown in FIG. 1) that are distributed within a passenger cabin of aircraft 100. The beacons broadcast unique identifiers (IDs) proximate to their locations. As passengers or other users of mobile devices travel within the cabin, the mobile devices receive the various IDs from the wireless beacons, and forward the IDs to a location server onboard aircraft 100 (also not shown in FIG. 1). The location server is able to identify location information of the mobile devices (and therefore, the location of the passengers or users of the mobile devices) within the cabin. The location server utilizes the location information to provide location-based services onboard aircraft 100. Some examples of the mobile devices include cells phones, laptops, tablets, etc. Cell phones and other devices that are capable of communicating with a cellular network are typically referred to as User Equipment (UE).

Some of the location-based services that may be provided to passengers include providing information regarding where the passenger is located within the cabin, providing information regarding the availability of storage space within overhead bins on aircraft 100, etc. Other location-based services that may be provided onboard aircraft 100 may be utilized by a maintenance crew onboard aircraft 100. For instance, the maintenance crew may be provided information regarding the status of various aircraft components as the maintenance crew travels through the cabin. This type of information may be useful to diagnose, install, service, or replace aircraft components onboard aircraft 100.

Figure 2:
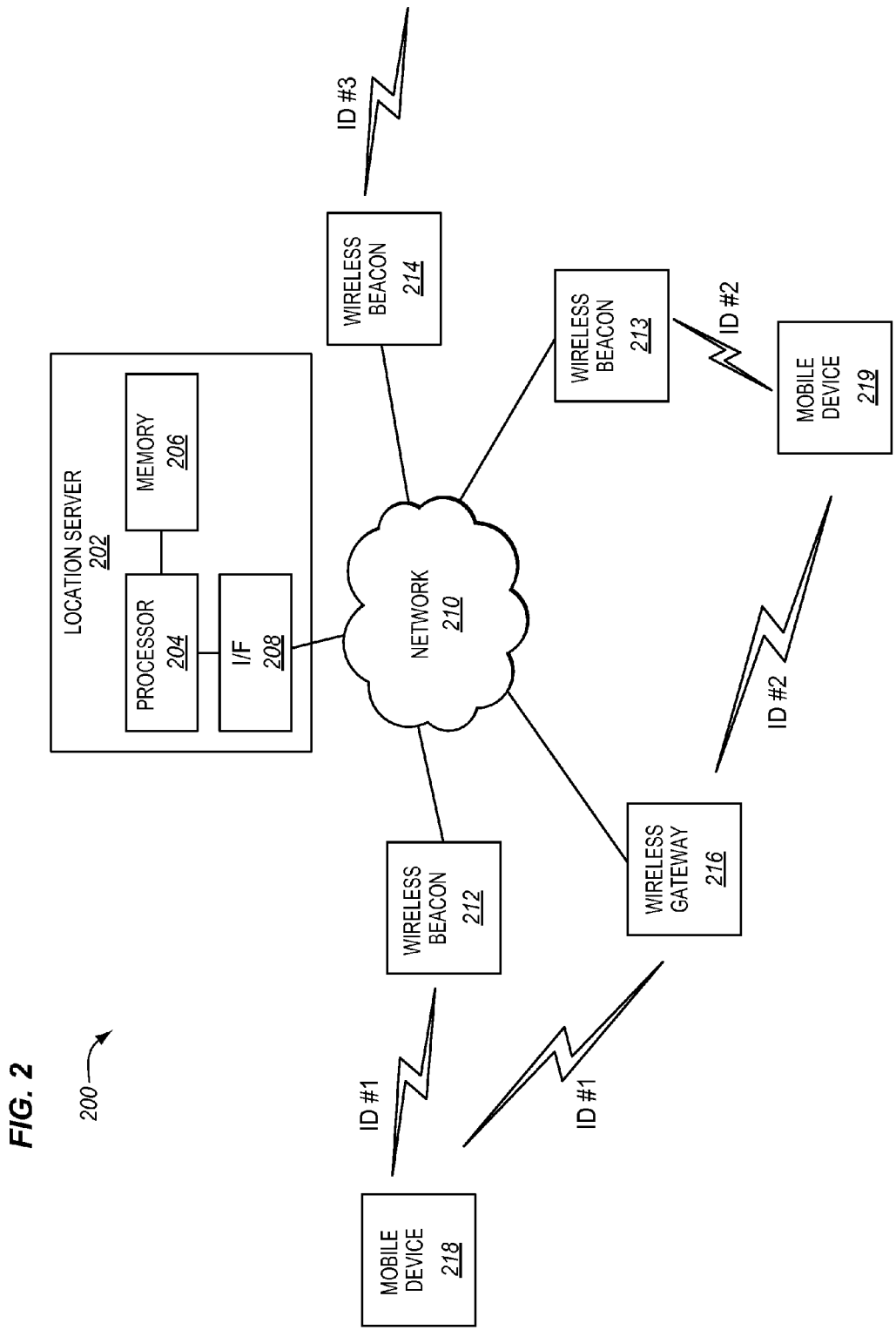
FIG. 2 is a block diagram of a system for providing location-based services onboard an aircraft to users having mobile devices in an exemplary embodiment.

FIG. 2 is a block diagram of a system 200 for providing location-based services onboard aircraft 100 for users having mobile devices in an exemplary embodiment. In this embodiment, system 200 includes a location server 202 that is communicatively coupled to a network 210, and a plurality of wireless beacons 212-214 that are also communicatively coupled to network 210. Beacons 212-214 in this embodiment are distributed within the cabin of aircraft 100, and each broadcast a unique ID to a small area. For instance, beacon 212 may broadcast ID #1 to one area of the cabin, while beacon 213 may broadcast ID #2 to another area of the cabin. The areas may be overlapping or non-overlapping as desired.

As passengers travel through the cabin, mobile devices 218-219 move into and out of range of different beacons 212-214 and therefore, receive different IDs or groups of IDs depending on their location within the cabin.

In this embodiment, mobile devices 218-219 forward the IDs received from one or more beacons 212-214 to location server 202 (e.g., mobile devices 218-219 may forward the IDs to location server 202 utilizing a wireless gateway 216 that is communicatively coupled to network 210). In some embodiments, mobile devices 218-219 may be referred to as Personal Electronic Devices (PEDs).

Location server 202 receives the IDs from mobile devices 218-219, and is able to identify location information for mobile devices 218-219 within the cabin based on which IDs or groups of IDs are received. For instance, if location server 202 receives ID #1 from mobile device 218, then location server 202 is able to determine that mobile device 218 is proximate to wireless beacon 212. Location server 202 provides the location information to mobile device 218 for display to a user. For instance, location server 202 may mark the location of mobile device 218 on a map of the cabin, and provide or transmit the map to mobile device 218 for display to the user.

While the specific hardware implementation of location server 202 is subject to design choices, one particular embodiment may include one or more processors 204 coupled with memory 206. Processor 204 includes any electronic circuits and/or optical circuits that are able to perform functions. For example, processor 204 may perform any functionality described herein for location server 202. Processor 204 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc.

Memory 206 includes any electronic circuits, and/or optical circuits, and/or magnetic circuits that are able to store data. For instance, memory 206 may store information regarding the locations of beacons 212-214, may store ID information about beacons 212-214, may store maps of the passenger cabin of aircraft 100, may store instructions for processor 204 to implement the functionality described herein for location server 202, etc. Memory 206 may include one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

In this embodiment, location server 202 also includes a network interface (I/F) 208 which communicatively couples location server 202 to network 210. I/F 208 includes any electronic circuits and/or optical circuits that are able to provide network signaling between location server 202 and network 210. For instance, if network 210 is a Power over Ethernet (PoE) or Ethernet network, then I/F 208 is able to provide Ethernet signaling and Ethernet frame processing capabilities to location server 202.

Beacons 212-214 in this embodiment comprise any electronic circuits and/or optical circuits that are able to wirelessly broadcasting unique identifiers (IDs) within the cabin of aircraft 100. For instance beacons 212-214 may include Bluetooth Low Energy (BLE) radios that are configured to broadcast IDs on advertising channels. As users carry mobile devices 218-219 about the cabin of aircraft 100, mobile devices 218-219 move into and out of wireless range of various beacons 212-214 and therefore, the particular IDs received by mobile devices 218-219 change based on where mobile devices 218-219 are relative to the location of beacons 212-214.

In this embodiment, beacons 212-214 are distributed at fixed locations within the cabin. Location server 202 is aware of the fixed locations of beacons 212-214 within the cabin, and their respective IDs. This allows location server 202 to identify location information for mobile devices 218-219 depending on which IDs or group of IDs are received by mobile devices 218-219.

The number of beacons 212-214 and the effective broadcast range for beacons 212-214 may vary in different implementations of system 200. When system 200 utilizes a fewer number of beacons 206 having a longer broadcast range, the location information for mobile devices 218-219 onboard aircraft 100 may have a larger uncertainty than if system 200 utilizes a larger number of beacons 212-214 having a shorter broadcast range. This is due to the size of the radio footprint around beacons 212-214. For example, if beacons 212-214 have a broadcast range of 20 feet, then the location information for mobile devices 218-219 would have an uncertainty around the locations of beacons 212-214 that would be larger than if beacons 212-214 had a broadcast range of 5 feet. This uncertainty may be reduced if the broadcast power of beacons 212-214 is known and if mobile devices 218-219 provide location server 202 with information about the power of the received signal strength (e.g., a Received Signal Strength Indication (RSSI)) from beacons 212-214. If the broadcast power is known for beacons 212-214 along with the RSSI information, then location server 202 may be able to more accurately identify the location information for mobile devices 218-219 since RSSI generally varies based on a distance between a receiver (e.g., mobile devices 218-219) and the transmitter (e.g., beacons 212-214). The uncertainty may also be reduced if mobile devices 218-219 receive multiple IDs from beacons 212-214, since location server 202 may be able to more accurately locate mobile devices 218-219 based on triangulation.

Figure 3:
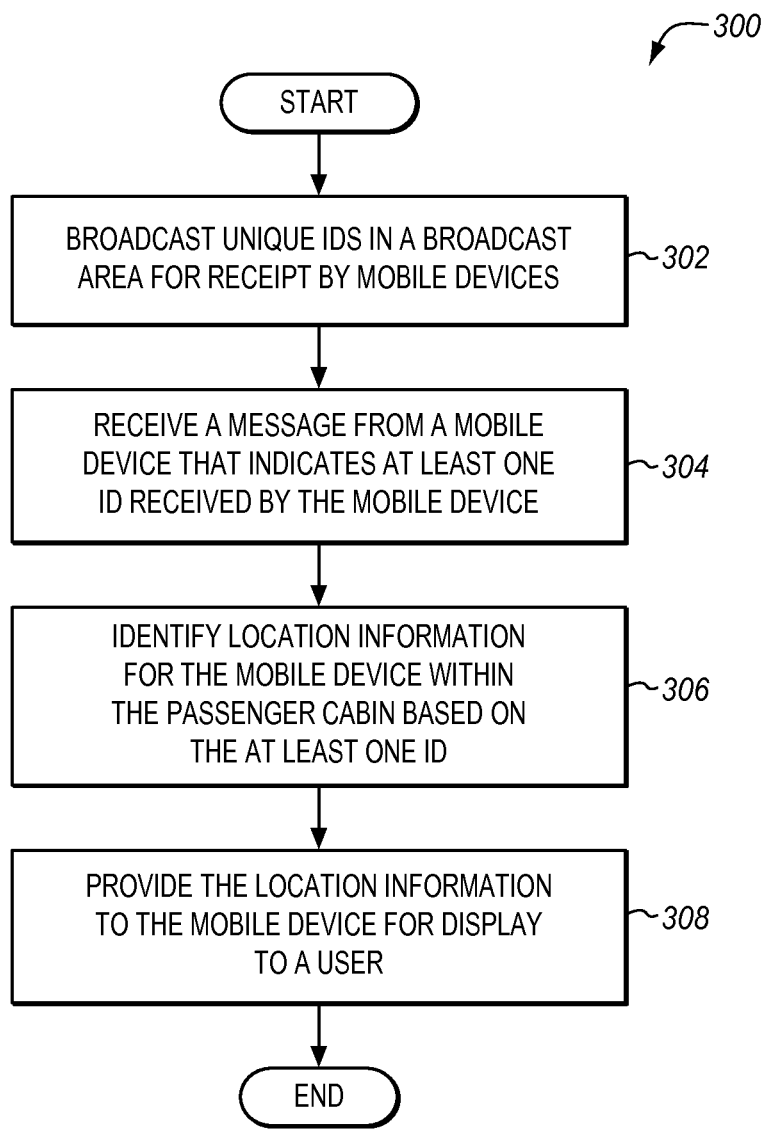
FIG. 3 is a method for providing a location-based service onboard an aircraft to users having mobile devices in an exemplary embodiment.

Assume that system 200 is in operation onboard aircraft 100, and that a user is carrying mobile device 218 onboard aircraft 100. FIG. 3 is a method 300 for providing a location-based service onboard aircraft 100 for users of mobile devices in an exemplary embodiment. Method 300 will be discussed with respect to system 200 of FIG. 2 and mobile device 218, although method 300 may be performed by other systems and mobile devices, not shown. The steps of the flow charts described herein may include other steps that are not shown. Also, the steps of the flow charts described herein may be performed in an alternate order.

As a user carries mobile device 218 within the passenger cabin of aircraft 100, mobile device 218 will move into and out of range of one or more of beacons 212-214. Beacons 212-214 each broadcast a unique ID in a broadcast area of the cabin for receipt by mobile device 218 (see step 302 of FIG. 3). Beacons 212-214 may be pre-configured with their unique IDs and/or the IDs for beacons 212-214 may be assigned by location server 202.

Figure 4:
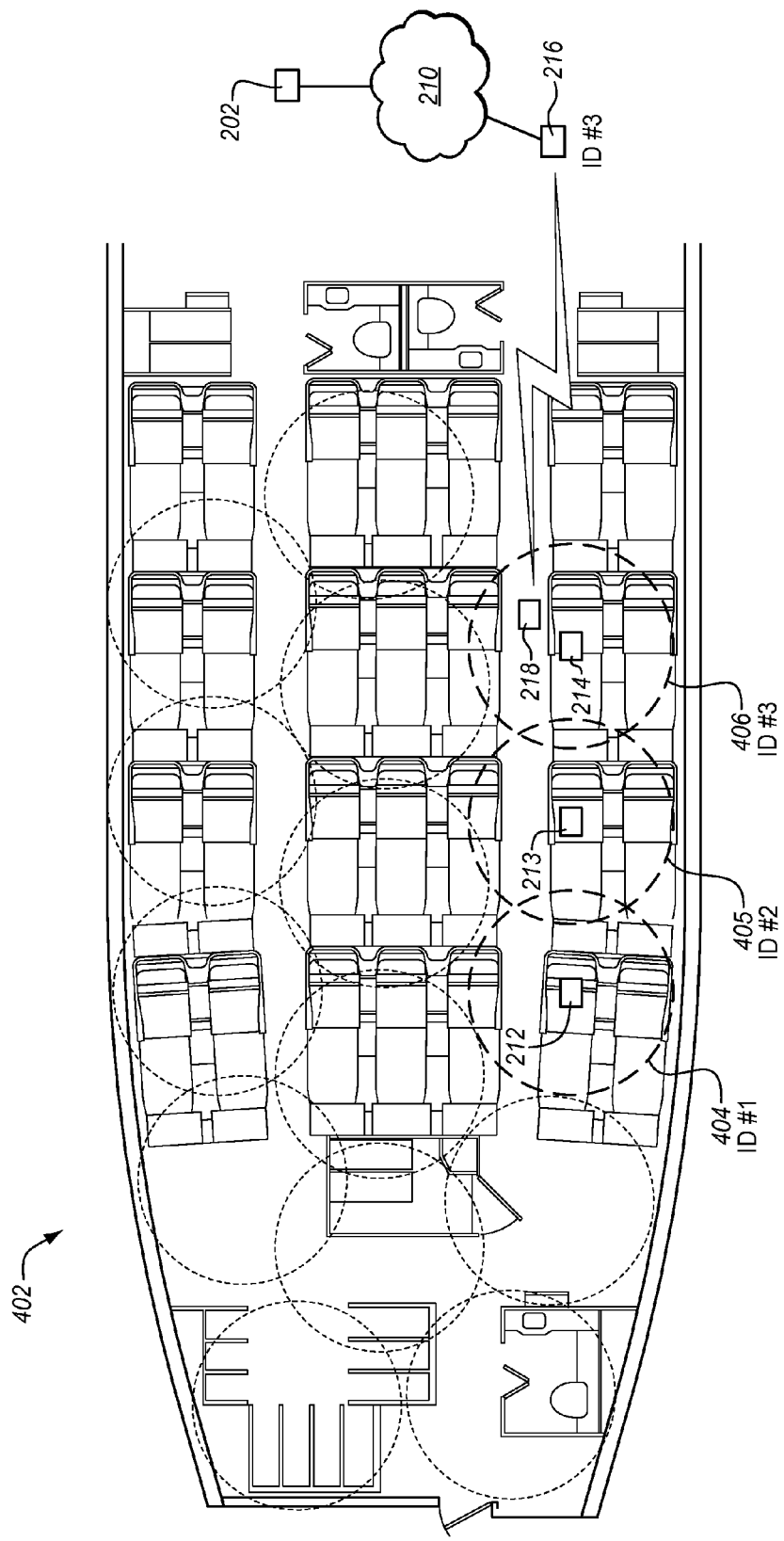
FIG. 4 illustrates a portion of a passenger cabin of an aircraft in an exemplary embodiment.

FIG. 4 illustrates a portion of a passenger cabin 402 of aircraft 100 in an exemplary embodiment. In FIG. 4, beacons 212-214 are dispersed within cabin 402 at various locations, where the locations of beacons 212-214 and the relative position of beacons 212-214 are arbitrarily selected for this discussion. Each of beacons 212-214 is surrounded by circles illustrated as dashed lines in FIG. 4, which define the boundary of broadcast ranges for each of beacons 212-214. Beacon 212 broadcasts ID #1 within a broadcast area 404, beacon 213 broadcasts ID #2 within a broadcast area 405, and beacon broadcasts ID #3 within a broadcast area 406. Only three broadcast areas 404-406 are illustrated for clarity, although system 200 may be implemented with more beacons to enable a more complete wireless coverage of cabin 402. The additional broadcast areas are also illustrated as dashed circles in FIG. 4.

Broadcast areas 404-406 in FIG. 4 are illustrated as having a particular size and shape, which have been arbitrarily selected for this discussion. Broadcast areas 404-406 may be of a different shape, size, and orientation depending on the type of antenna used by beacons 212-214, and/or the broadcast power of beacons 212-214, and/or the Radio Frequency (RF) absorption criteria of the materials and structures within cabin 402, etc.

As the user travels across cabin 402, mobile device 218 receives different IDs depending on the location of mobile device 218 relative to broadcast areas 404-406. In response to receiving the IDs, mobile device 218 transmits a message to location server 202 (e.g., utilizing wireless gateway 216 of FIG. 2) that indicates the ID(s) received by mobile device 218. Location server 202 receives the ID(s) from mobile device 218 (see step 304 of FIG. 3), and identifies location information for mobile device 218 based on the ID(s) received by mobile device 218 (see step 306 of FIG. 3).

For instance, with mobile device 218 within broadcast area 406 of beacon 214, location server 202 receives a message from mobile device 218 that indicates or includes ID #3. Using information regarding where within cabin 402 beacon 214 is located, location server 202 is able to determine that mobile device 218 is proximate to beacon 214. Location server 202 provides the location information to mobile device 218 for display to a user (see step 308 of FIG. 3). Location server 202 may provide the location information to mobile device 218 utilizing wireless gateway 216 of FIG. 2.

As discussed previously, the accuracy of the approximation may be improved utilizing RSSI information generated by mobile device 218 regarding beacon 214. For instance, mobile device 218 may generate RSSI information for beacon 214, and provide the RSSI information to location server 202. Location server 202 may then reduce the uncertainty for the location information based on the RSSI information, which varies for a fixed output power at least partially based on a distance between beacon 214 and mobile device 218. The relationship between RSSI and distance may be modeled more accurately during installation of system 200 onboard aircraft 100.

Further, the accuracy of the approximation may be improved utilizing triangulation information. For instance, mobile device 218 may receive multiple IDs when broadcast areas 404-406 overlap, and location server 202 may analyze the multiple IDs to calculate a more accurate approximation of the location of mobile device 218.

Method 300 may be performed in real-time or near real-time. As a user travels through cabin 402, mobile device 218 transmits messages to location server 202 that include the IDs received by mobile device 218. Location server 202 may then generate updated location information for mobile device 218 based on any new ID(s) sent by mobile device 218.

In another embodiment, the location information provided by location server 202 to mobile device 218 may include a set of coordinates within cabin 402 that allows mobile device 218 to correlate its location with known coordinates of physical features within cabin 402. For instance, mobile device 218 may store coordinates for different seats within cabin 402, and determine its location relative to the seats utilizing the information provided by location server 202.

In another embodiment, location server 202 may identify a map of a Layout Of Passenger Accommodations (LOPA) for aircraft 100, and modify the map to indicate the location information for mobile device 218 within cabin 402. Generally, a LOPA for aircraft 100 is an engineering drawing that is used to graphically represent seats, exits, lavatories, emergency equipment, etc., that are present onboard aircraft 100.

Figure 5:
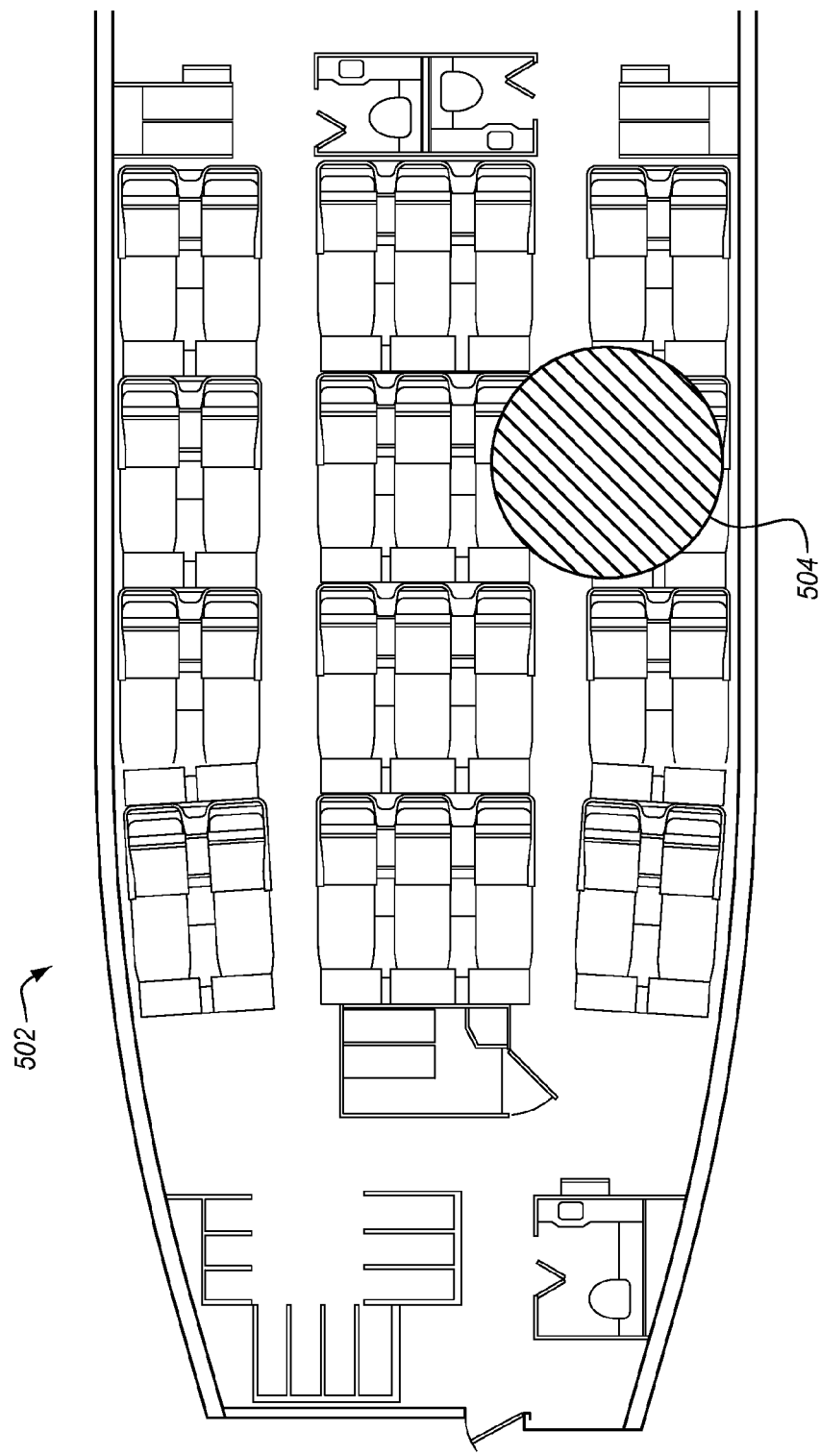
FIG. 5 illustrates a map of a Layout Of Passenger Area (LOPA) for a passenger cabin that indicates a location of a mobile device in an exemplary embodiment.

FIG. 5 illustrates a map 502 of a LOPA for cabin 402 that indicates the location information for mobile device 218 in an exemplary embodiment. Map 502 includes a marked area 504 that corresponds with the location information for mobile device 218 as determined by location server 202. Location server 202 may then provide map 502 to mobile device 218 (e.g., utilizing wireless gateway 216 of FIG. 2). Mobile device 218 may display map 502 to a user, allowing the user to identify his or her location within cabin 402.

Figure 6:
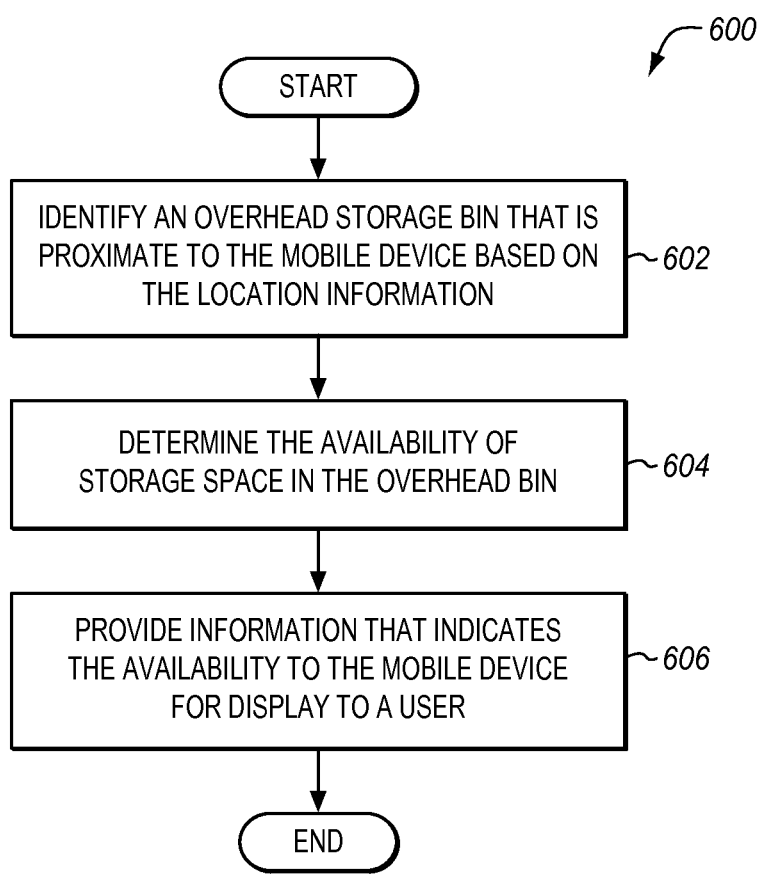
FIG. 6 is a method for providing another location-based service onboard an aircraft to users having mobile devices in an exemplary embodiment.

In another embodiment, location server 202 may provide additional location-based services onboard aircraft 100 by providing information to passengers regarding the availability of space in storage bins, which is described in FIG. 6. FIG. 6 is a method 600 for providing another location-based service onboard aircraft 100 for users having mobile devices in an exemplary embodiment. Method 600 will be discussed with respect to system 200 of FIG. 2 and mobile device 218, although method 300 may be performed by other systems and mobile devices, not shown.

As the user of mobile device 218 moves through cabin 402, location server 202 continues to update the location information for mobile device 218. Location server 202 identifies an overhead bin that is proximate to mobile device 218 based on the location information (see step 602 of FIG. 6).

Figure 7:
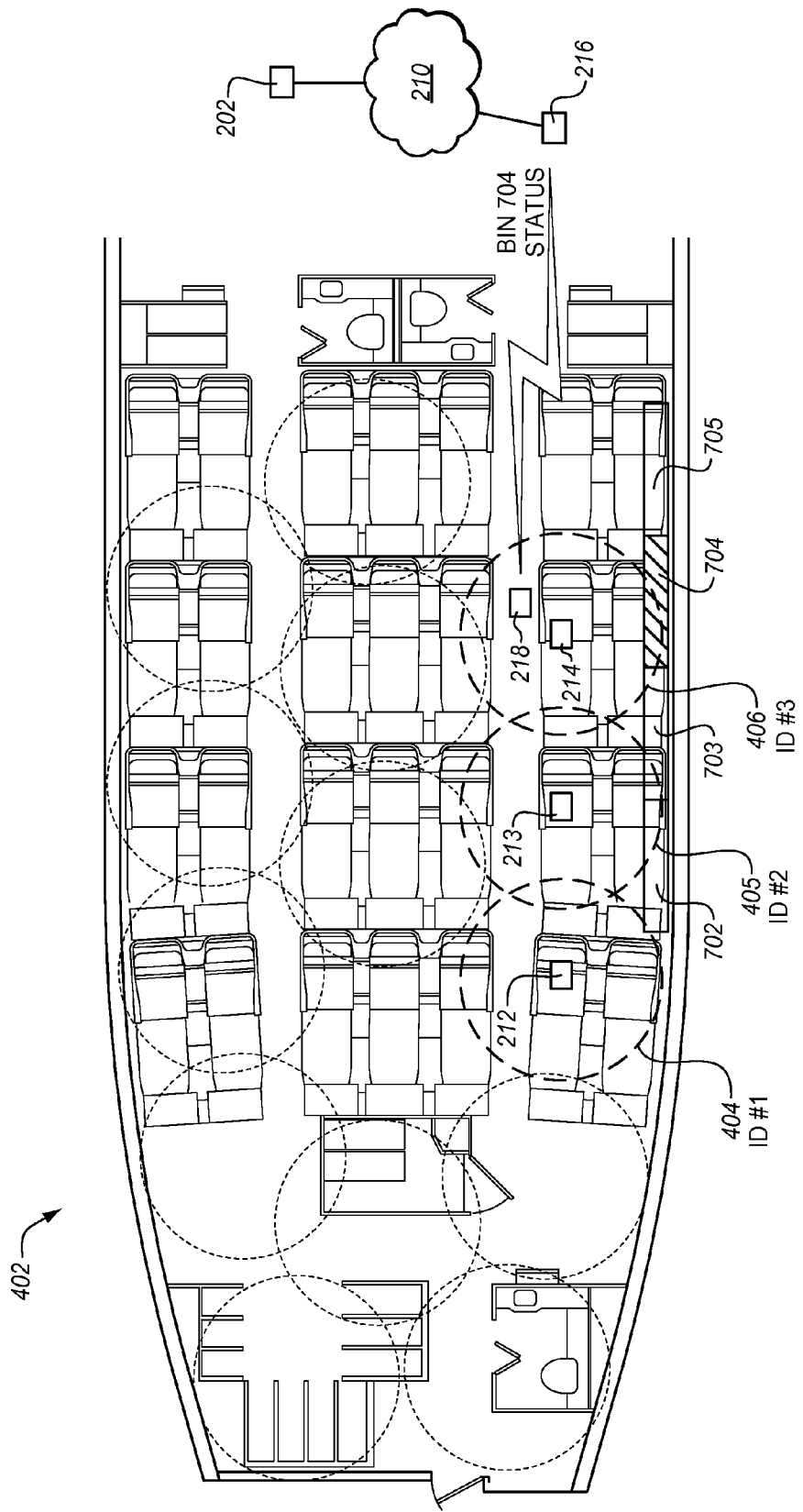
FIG. 7 illustrates a passenger cabin of an aircraft including overhead bins in an exemplary embodiment.

FIG. 7 illustrates cabin 402 of aircraft 100 including overhead bins 702-705 in an exemplary embodiment. In FIG. 7, overhead bins 702-705 are proximate to mobile device 218. Location server 202 determines the availability of space within overhead bins 702-705 (see step 604 of FIG. 6). To do so, location server 202 may utilize sensors (not shown) located within or near overhead bins 702-705, and determine if overhead bins 702-705 have storage available. Location server 202 provides this information to mobile device 218 (see step 606 of FIG. 6). Mobile device 218 may utilize this information directly and display the information to a user, or may receive a map from location server 202 that indicates information about overhead bins 702-705.

Figure 8:
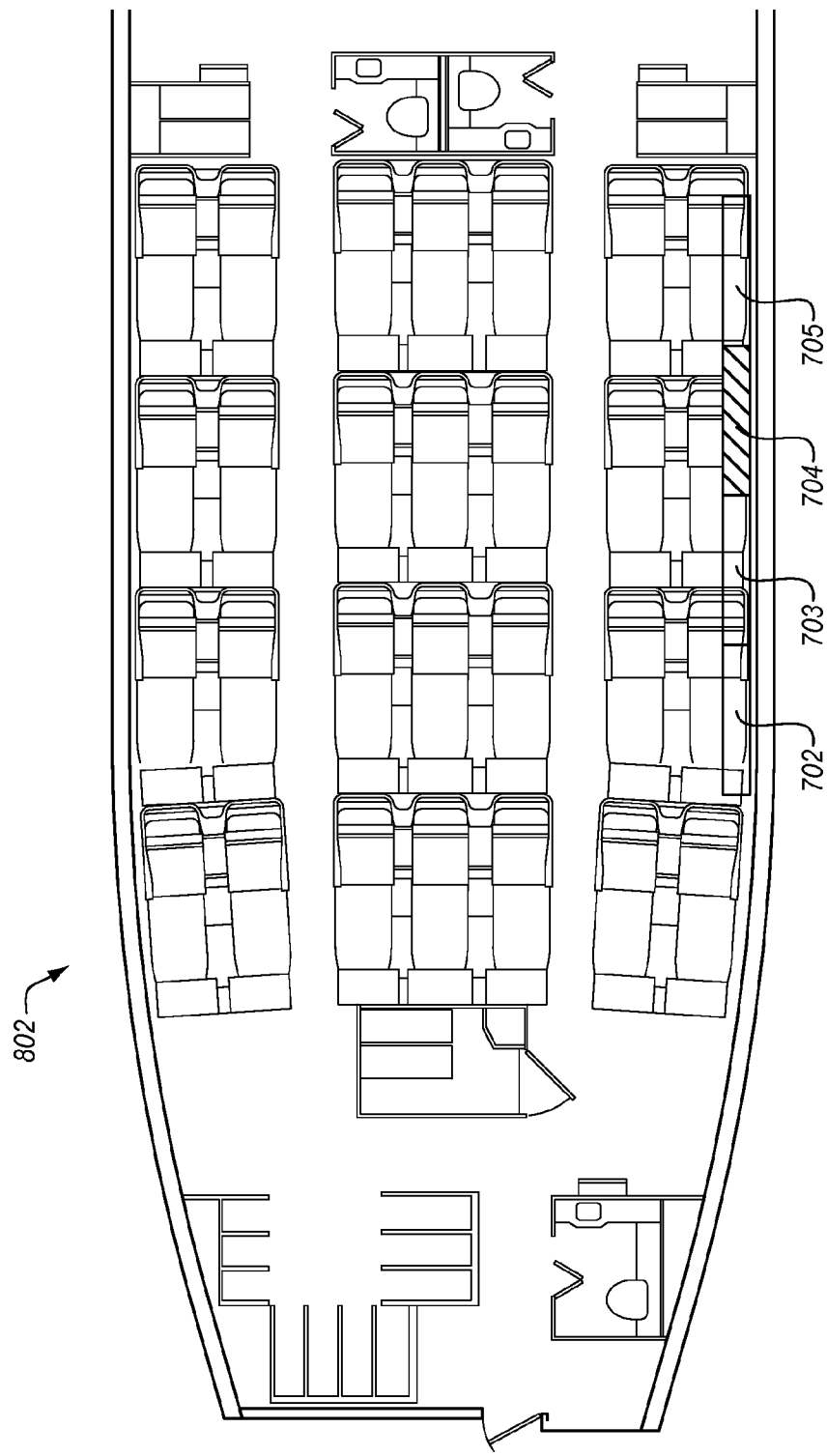
FIG. 8 illustrates a map of a LOPA for a passenger cabin that indicates the availability of storage space in overhead bins in an exemplary embodiment.

FIG. 8 illustrates a map 802 of the LOPA for cabin 402 that indicates the availability of storage space in overhead bins 702-705 in an exemplary embodiment. Map 802 includes a marked area for overhead bin 704, indicating that overhead bin 704 lacks storage space. Location server 202 may then provide map 802 to mobile device 218 (e.g., utilizing wireless gateway 216 of FIG. 2). Mobile device 218 may display map 802 to a user, allowing the user to identify the availability of storage within overhead bins 702-705.

Figure 9:
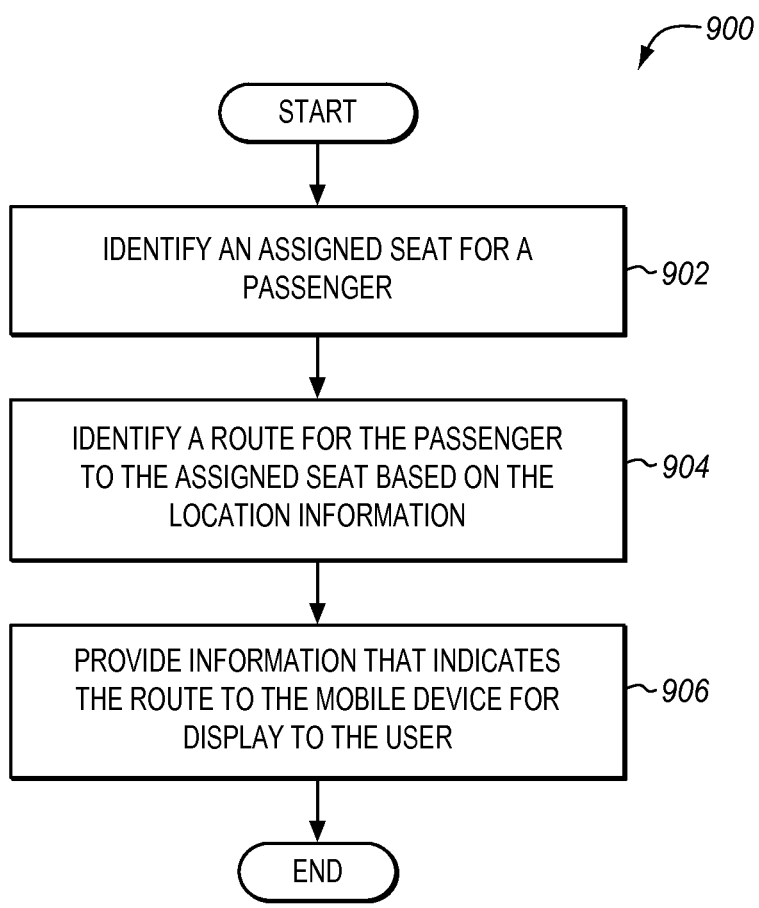
FIG. 9 is a method for providing another location-based service onboard an aircraft to users having mobile devices in an exemplary embodiment.

In another embodiment, location server 202 may provide additional location-based services onboard aircraft 100 by providing information to passengers regarding a route to their assigned seat, which is described in FIG. 9. FIG. 9 is a method 900 for providing another location-based service onboard aircraft 100 for users having mobile devices in an exemplary embodiment. Method 900 will be discussed with respect to system 200 of FIG. 2 and mobile device 218, although method 900 may be performed by other systems and mobile devices, not shown.

As the user of mobile device 218 moves through cabin 402, location server 202 continues to update the current location of mobile device 218. Location server 202 identifies an assigned seat for the passenger (see step 902 of FIG. 9). To identify the assigned seat, location server 202 may query a reservation system for the airline with information about the passenger to identify the assigned seat.

Figure 10:
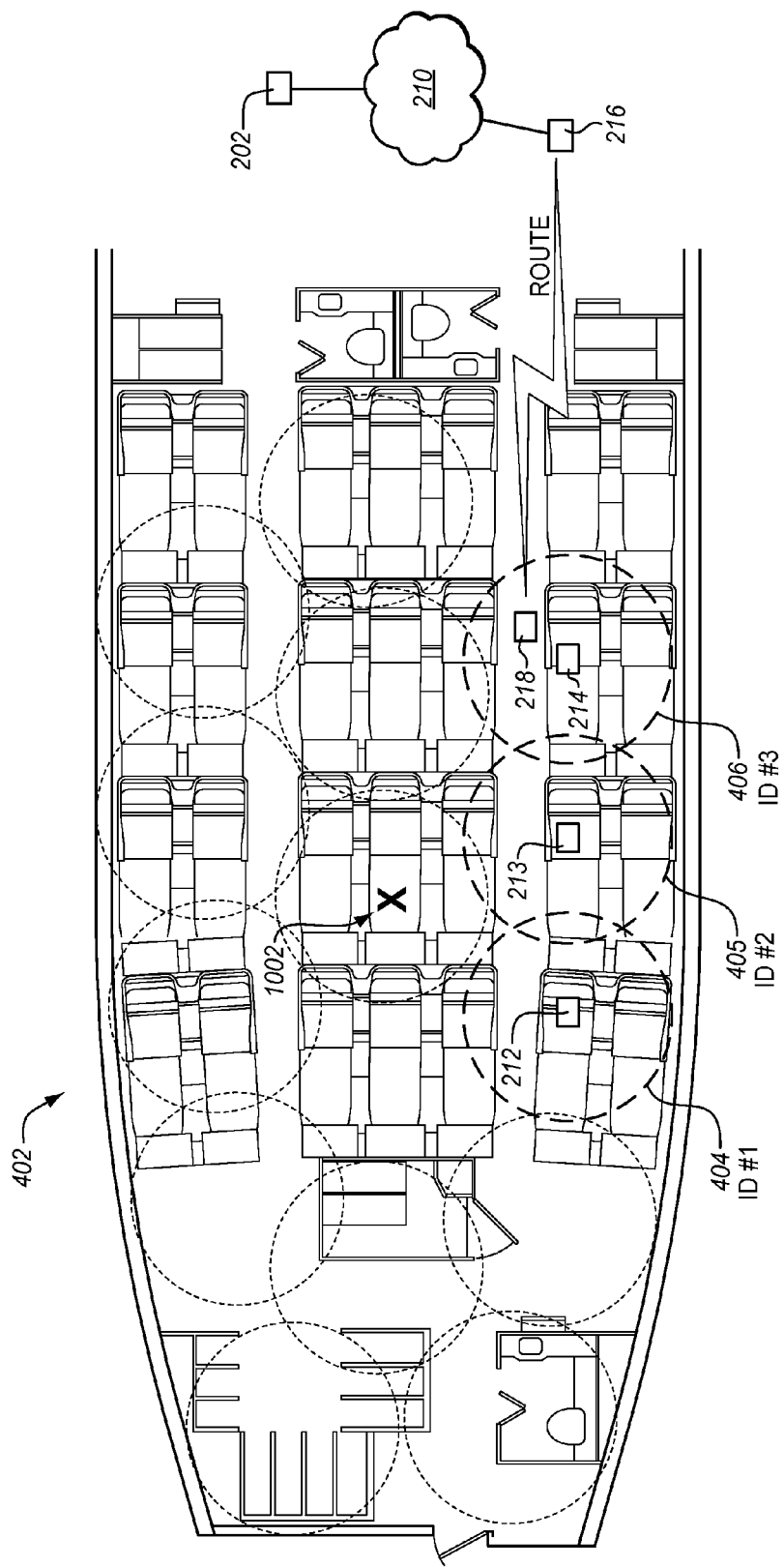
FIG. 10 illustrates a passenger cabin of an aircraft with an identification of an assigned seat for a passenger in an exemplary embodiment.

FIG. 10 illustrates cabin 402 of aircraft 100 that identifies an assigned seat 1002 for the passenger in an exemplary embodiment. In FIG. 10, assigned seat 1002 is illustrated with an X. Location server 202 identifies a route for the passenger to assigned seat 1002 based on the location information for mobile device 218 (see step 904 of FIG. 9). The route may be based on the seating arrangement for cabin 402, other passengers and their respective locations within cabin 402, etc. Location server 202 provides information that indicates the route to mobile device 218 (see step 906 of FIG. 9). Mobile device 218 may utilize this information directly and display the information to a passenger, or may receive a map from location server 202 that indicates the route information. In some embodiments, mobile device 218 may present haptic feedback as the passenger nears assigned seat 1002. For instance, mobile device 218 may vibrate as the passenger nears assigned seat 1002, may vibrate differently based on whether the passenger is port or starboard of assigned seat 1002, etc.

Figure 11:
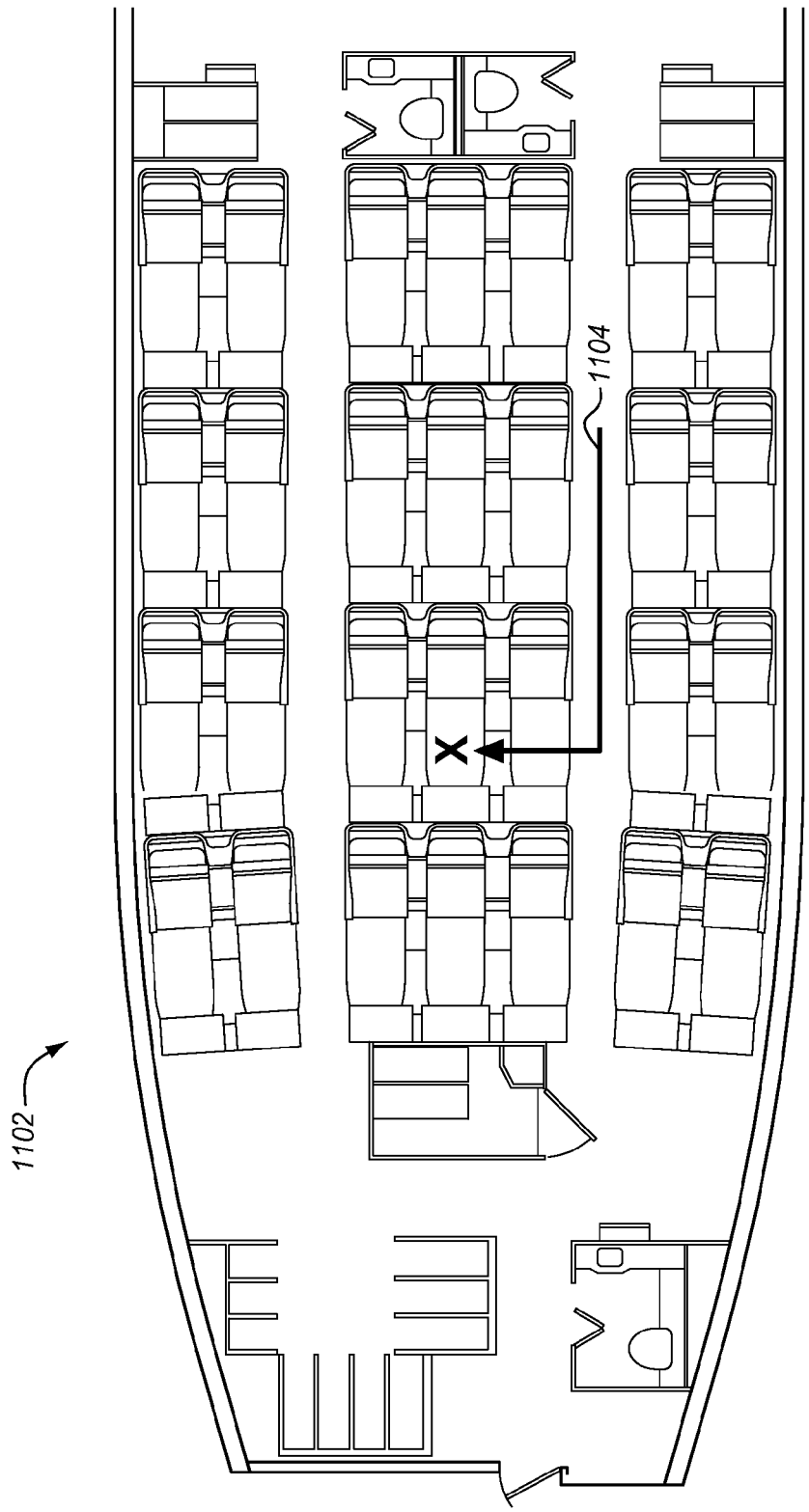
FIG. 11 illustrates a map of a LOPA for a passenger cabin that indicates a route from a location of a mobile device for a passenger to an assigned seat for the passenger in an exemplary embodiment.

FIG. 11 illustrates a map 1102 of the LOPA for cabin 402 that indicates a route 1104 to assigned seat 1002 for a passenger in an exemplary embodiment. Location server 202 may then provide map 1102 to mobile device 218 (e.g., utilizing wireless gateway 216 of FIG. 2). Mobile device 218 may display map 1102 to the passenger, allowing the passenger to identify route 1104 to the assigned seat.

In another embodiment, mobile device 218 may be instructed by location server 202 to automatically enter into and out of an "airplane mode" when various criteria are met. When mobile device 218 enters into this mode, a cellular radio on mobile device 218 is turned off. This is typically performed before take-off and after landing. The criteria for instructing mobile device 218 to enter into this mode may include the closing of the doors onboard aircraft 100, in response to the passenger nearing assigned seat 1002, in response to the passenger boarding aircraft 100, etc. The criteria for instructing mobile device 218 to exit from this mode may include the landing of aircraft 100 after flight, the opening of doors onboard aircraft 100 upon landing, responsive to the passenger disembarking from aircraft 100, etc.

In another embodiment, location server 202 may provide additional location-based services onboard aircraft 100 by enabling crew members to respond more quickly to a call button activation onboard aircraft 100. As crew members move about cabin 402, location server 202 receives messages from the mobile devices of the crew members that indicate the IDs received by the mobile devices. Location server 202 identifies location information for each of the crew members based on the IDs. If a call button is activated by a passenger, location server 202 is able to identify a crew member that is proximate to the seat associated with the call button activation, and notify the crew member of the call button activation. In some embodiments, the mobile device of the crew member may present haptic feedback as the crew member nears the seat associated with the call button activation. For instance, mobile device may vibrate as the crew member nears the seat, may vibrate differently based on whether the crew member is port or starboard of the seat, etc.

In another embodiment, location-based services may be provided onboard aircraft 100 to maintenance crews to allow the maintenance crews to quickly identify service or installation scheduled for aircraft components within cabin 402. For instance, if the In Flight Entertainment (IFE) electronics for a particular seat onboard aircraft 100 is scheduled for installation, removal, and/or maintenance, location server 202 is able to track the locations of the maintenance crew within cabin 402 based on the IDs received by the mobile devices of the maintenance crew. Location server 202 is able to determine which maintenance crew member is near the IFE electronics, and provide information to the maintenance crew member about the scheduled activity for the aircraft component. Location server 202 may, for instance, modify a map of the LOPA for cabin 402 to highlight the IFE electronics, and provide the map to the maintenance crew member. This allows the maintenance crew member to quickly identify the activity scheduled for the various aircraft components onboard aircraft 100.

System 200 provides for a wide variety of location-based services onboard aircraft 100, which enables new services and features for both passengers and crews that were previously unavailable. Such location-based services may enable new revenue streams from passengers, and may also improve the efficiency of flight crews and maintenance crews in performing their jobs.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A system for providing location-based services onboard an aircraft for users having mobile devices, the system comprising:
   a plurality of wireless beacons that are dispersed at fixed locations within a passenger cabin of the aircraft, each wireless beacon configured to broadcast a unique identifier (ID) in a broadcast area for receipt by the mobile devices; and
   a location server configured to receive a message from a mobile device that indicates at least one ID received by the mobile device, to identify location information for the mobile device within the passenger cabin based on the at least one ID, to identify an overhead storage bin that is proximate to the mobile device, to determine an availability of storage space within the overhead bin, and to provide information that indicates the availability to the mobile device for display to a user.

2. The system of claim 1 wherein:
   the location server is configured to modify a map of a Layout Of Passenger Accommodations (LOPA) for the aircraft to indicate the location information, and to provide the modified map to the mobile device for display to the user.

3. The system of claim 1 wherein:
   the location server is configured to modify a map of a Layout Of Passenger Accommodations (LOPA) for the aircraft to indicate the availability, and to provide the modified map to the mobile device for display to the user.

4. The system of claim 1 wherein:
   the location server is configured to identify an assigned seat for a passenger associated with the mobile device, to identify a route for the passenger to the assigned seat based on the location information, and to provide information that indicates the route to the mobile device for display to the user.

5. The system of claim 4 wherein:
   the location server is configured to modify a map of a Layout Of Passenger Accommodations (LOPA) for the aircraft to indicate the route, and to provide the modified map to the mobile device for display to the user.

6. The system of claim 4 wherein:
   the location server is configured to direct the mobile device to provide haptic feedback to the passenger responsive to the passenger being proximate to the assigned seat.

7. A system for providing location-based services onboard an aircraft for users having mobile devices, the system comprising:
   a plurality of wireless beacons that are dispersed at fixed locations within a passenger cabin of the aircraft, each wireless beacon configured to broadcast a unique identifier (ID) in a broadcast area for receipt by the mobile devices; and
   a location server configured to detect a call button activation for a seat, to receive messages from mobile devices of crew members that indicate IDs received by the mobile devices, and to identify location information for each of the crew members based on the IDs;
   the location server is configured to identify a crew member that is proximate to the seat based on the location information for each of the crew members, and to notify the crew member of the call button activation.

8. A system for providing location-based services onboard an aircraft for users having mobile devices, the system comprising:
   a plurality of wireless beacons that are dispersed at fixed locations within a passenger cabin of the aircraft, each wireless beacon configured to broadcast a unique identifier (ID) in a broadcast area for receipt by the mobile devices; and
   a location server configured to receive a message from a mobile device that indicates at least one ID received by the mobile device, to identify location information for the mobile device within the passenger cabin based on the at least one ID;
   the location server configured to identify an aircraft component scheduled for one of installation, removal, and maintenance that is proximate to the mobile device based on the location information, and to provide information that indicates the aircraft component to the mobile device for display to a user.

9. A method for providing location-based services onboard an aircraft for users having mobile devices, the method comprising:
   broadcasting, by each of a plurality of wireless beacons that are dispersed at fixed locations within a passenger cabin of the aircraft, a unique identifier (ID) in a broadcast area for receipt by the mobile devices;
   receiving, by a location server, a message from a mobile device that indicates at least one ID received by the mobile device;
   identifying, by the location server, location information for the mobile device within the passenger cabin based on the at least one ID;
   identifying, by the location server, an overhead storage bin that is proximate to the mobile device;
   determining, by the location server, an availability of storage space within the overhead bin; and providing information that indicates the availability to the mobile device for display to a user.

10. The method of claim 9 further comprising:
modifying a map of a Layout Of Passenger Accommodations (LOPA) for the aircraft to indicate the location information; and
providing the modified map to the mobile device for display to the user.

11. The method of claim 9 wherein providing the information that indicates the availability to the mobile device further comprises:
modifying a map of a Layout Of Passenger Accommodations (LOPA) for the aircraft to indicate the availability; and
providing the modified map to the mobile device for display to the user.

12. The method of claim 9 further comprising:
identifying, by the location server, an assigned seat for a passenger associated with the mobile device;
identifying, by the location server, a route for the passenger to the assigned seat based on the location information; and
providing, by the location server, information that indicates the route to the mobile device for display to the user.

13. The method of claim 12 wherein providing the information that indicates the route further comprises:
modifying a map of a Layout Of Passenger Accommodations (LOPA) for the aircraft to indicate the route; and
providing the modified map to the mobile device for display to the user.

14. The method of claim 12 further comprising:
directing, by the location server, the mobile device to provide haptic feedback to the passenger responsive to the passenger being proximate to the assigned seat.

15. A method for providing location-based services onboard an aircraft for users having mobile devices, the method comprising:
broadcasting, by each of a plurality of wireless beacons that are dispersed at fixed locations within a passenger cabin of the aircraft, a unique identifier (ID) in a broadcast area for receipt by the mobile devices;
detecting, by a location server, a call button activation for a seat;
receiving, by the location server, messages from mobile devices of crew members that indicate IDs received by the mobile devices;
identifying, by the location server, location information for each of the crew members based on the IDs;
identifying, by the location server, a crew member that is proximate to the seat based on the location information for each of the crew members; and
notifying, by the location server, the crew member of the call button activation.

16. A method for providing location-based services onboard an aircraft for users having mobile devices, the method comprising:
broadcasting, by each of a plurality of wireless beacons that are dispersed at fixed locations within a passenger cabin of the aircraft, a unique identifier (ID) in a broadcast area for receipt by the mobile devices;
receiving, by a location server, a message from a mobile device that indicates at least one ID received by the mobile device;
identifying, by the location server, location information for the mobile device within the passenger cabin based on the at least one ID;
identifying, by the location server, an aircraft component scheduled for one of installation, removal, and maintenance that is proximate to the mobile device based on the location information; and
providing, by the location server, information that indicates the aircraft component to the mobile device for display to a user.

* * * * *